(12) United States Patent
Fu

(10) Patent No.: US 12,682,888 B2
(45) Date of Patent: Jul. 14, 2026

(54) METHOD AND DEVICE FOR GENERATING SPEECH RECOGNITION TRAINING SET

(71) Applicant: Jingdong Technology Holding Co., Ltd., Beijing (CN)

(72) Inventor: Li Fu, Beijing (CN)

(73) Assignee: Jingdong Technology Holding Co., Ltd., Beijing (CN)

( * ) Notice: Subject to any disclaimer, the term of this patent is extended or adjusted under 35 U.S.C. 154(b) by 260 days.

(21) Appl. No.: 18/559,398

(22) PCT Filed: Apr. 15, 2022

(86) PCT No.: PCT/CN2022/087029
§ 371 (c)(1),
(2) Date: Nov. 7, 2023

(87) PCT Pub. No.: WO2022/237448
PCT Pub. Date: Nov. 17, 2022

(65) Prior Publication Data
US 2024/0233708 A1 Jul. 11, 2024

(30) Foreign Application Priority Data

May 8, 2021 (CN) ......................... 202110514350.X

(51) Int. Cl.
*G10L 15/06* (2013.01)
*G06V 10/764* (2022.01)
(Continued)

(52) U.S. Cl.
CPC .......... *G10L 15/063* (2013.01); *G06V 10/764* (2022.01); *G06V 10/774* (2022.01);
(Continued)

(58) Field of Classification Search
CPC ...... G06V 20/41; G06V 20/63; G06V 10/774;
G06V 30/153; G10L 15/02; G10L 15/063
See application file for complete search history.

(56) References Cited

U.S. PATENT DOCUMENTS 6,880,171 B1 4/2005 Ahmad et al.
2015/0088508 A1 3/2015 Bharadwaj et al.
(Continued)

FOREIGN PATENT DOCUMENTS

CN 106604125 A 4/2017
CN 108495162 A 9/2018
(Continued)

OTHER PUBLICATIONS

Xianguo (Computer English Translation of Chinese Patent No. CN 106604125 A). (Year: 2017).*
(Continued)

*Primary Examiner* — Daniel G Mariam
(74) *Attorney, Agent, or Firm* — Nixon Peabody LLP

(57) ABSTRACT

Disclosed in the present disclosure are a method and apparatus for generating a speech recognition training set. The method may include: acquiring a to-be-processed audio and a to-be-processed video, where the to-be-processed video comprises text information corresponding to the to-be-processed audio; recognizing the to-be-processed audio to obtain an audio text; recognizing text information in the to-be-processed video to obtain a video text; and using, based on consistency of the audio text with the video text, the to-be-processed audio as a speech sample and the video text as a label to obtain the speech recognition training set.

15 Claims, 7 Drawing Sheets

300

(51) Int. Cl.

| | |
|---|---|
| *G06V 10/774* | (2022.01) |
| *G06V 20/40* | (2022.01) |
| *G06V 20/62* | (2022.01) |
| *G06V 30/148* | (2022.01) |
| *G10L 25/57* | (2013.01) |
| *G10L 25/93* | (2013.01) |

(52) U.S. Cl.
CPC .............. *G06V 20/41* (2022.01); *G06V 20/63* (2022.01); *G06V 30/153* (2022.01); *G10L 25/57* (2013.01); *G10L 25/93* (2013.01)

(56) References Cited

U.S. PATENT DOCUMENTS

| | | | |
|---|---|---|---|
| 2018/0301161 A1 | 10/2018 | Kocks et al. | |
| 2019/0349641 A1 | 11/2019 | Choi et al. | |
| 2021/0006867 A1 | 1/2021 | Liu | |
| 2023/0027412 A1* | 1/2023 | Huang | G06V 30/147 |
| 2024/0064383 A1* | 2/2024 | Li | G10L 15/063 |

FOREIGN PATENT DOCUMENTS

| | | |
|---|---|---|
| CN | 108924626 A | 11/2018 |
| CN | 109257659 A | 1/2019 |
| CN | 109803180 A | 5/2019 |
| CN | 110310626 A | 10/2019 |
| CN | 111079791 A | 4/2020 |
| CN | 111343496 A | 6/2020 |
| CN | 111639233 A | 9/2020 |
| JP | 2005092295 A | 4/2005 |
| JP | 2019198074 A | 11/2019 |
| JP | 2020030367 A | 2/2020 |

OTHER PUBLICATIONS

Yifeng (Computer English Translation of Chinese Patent No. CN 111639233 A). (Year: 2020).*

Wang. "Design and Implementation of Short Video Subtitle Generation System Based on Voice Understanding," Master's Thesis for Beijing Jiaotong University, China's Master's Theses Electronic Technology & Information Science Series (2021) [English Abstract].

Pranali et al. "Inhalt based video recuperation system using OCR and ASR technologies." 2015 international conference on computational intelligence and communication networks (CICN), IEEE (2015).

CN Office Action Issued in CN Application No. 202110514350.X, dated Mar. 14, 2025 (18 Pages).

International Search Report of International Searching Authority for International Patent Application No. PCT/CN2022/087029, mailed May 30, 2022, with English language translation (4 pages).

Takahiro Oku et al.; "Development of Speech and Language Corpora by Using Broadcast Speech and Closed Caption"; Information Processing Society of Japan (IPSJ) SIG Technical Report; vol. 2014-SLP-103, No. 2; Oct. 24, 2014; in Japanese (5 pages).

Examination Report in related Japanese Patent Application No. 2023-568632, dated Jan. 21, 2025, in Japanese (4 pages).

* cited by examiner

100

103

102

104

101

105

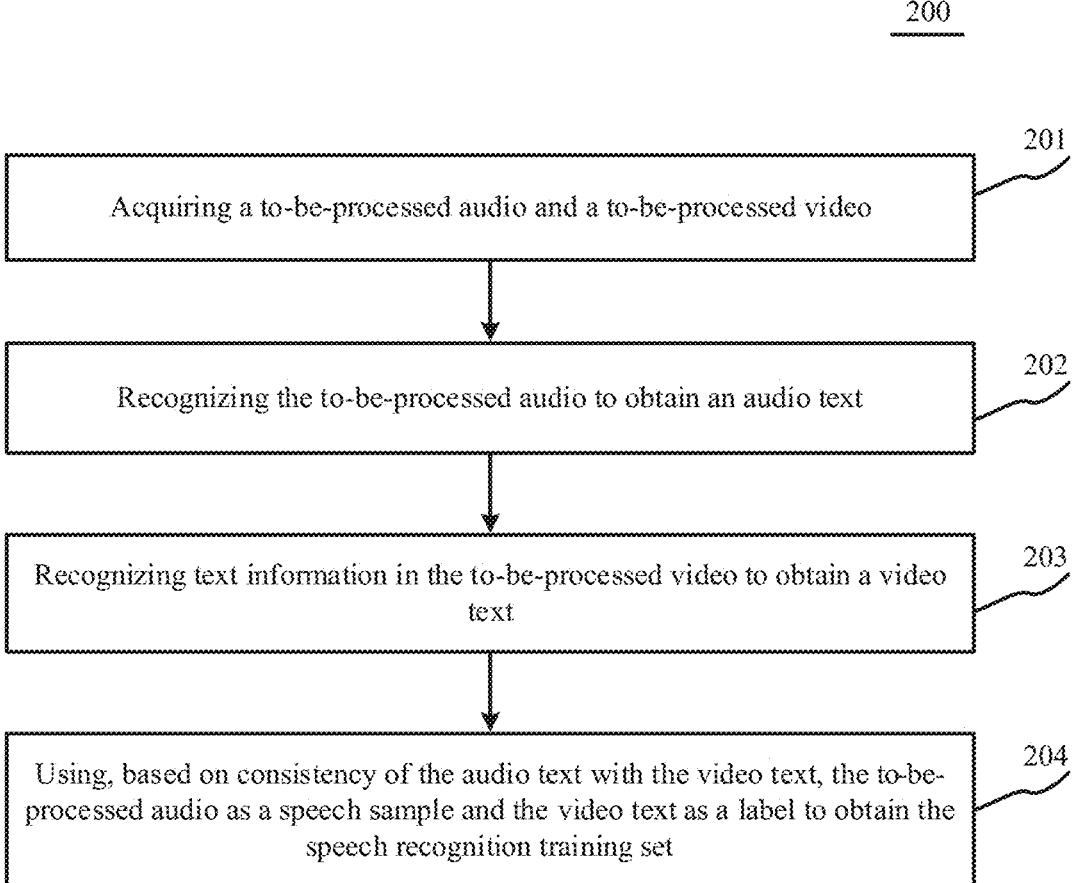

200

Acquiring a to-be-processed audio and a to-be-processed video — 201

Recognizing the to-be-processed audio to obtain an audio text — 202

Recognizing text information in the to-be-processed video to obtain a video text — 203

Using, based on consistency of the audio text with the video text, the to-be-processed audio as a speech sample and the video text as a label to obtain the speech recognition training set — 204

Fig. 2

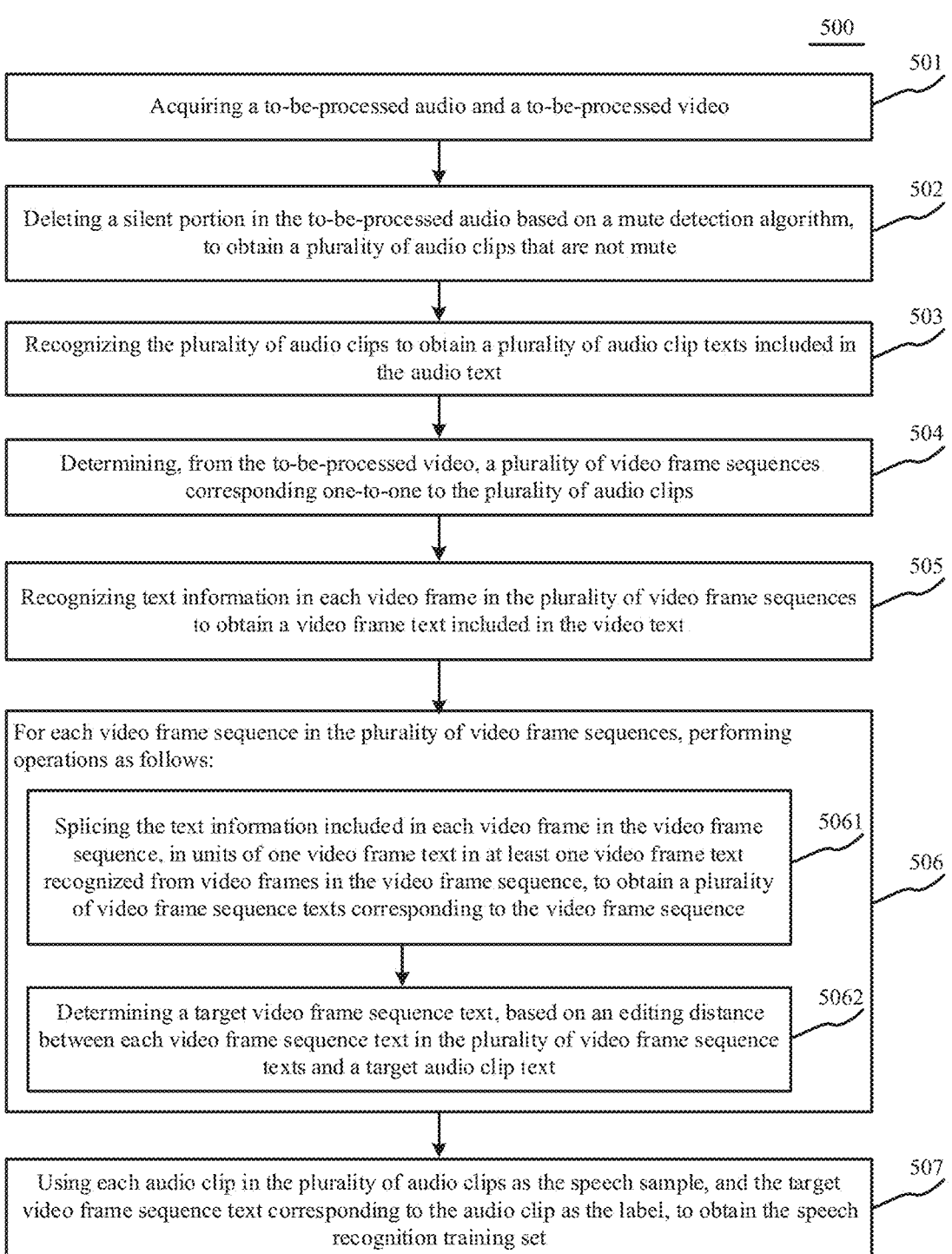

500

501

Acquiring a to-be-processed audio and a to-be-processed video

502

Deleting a silent portion in the to-be-processed audio based on a mute detection algorithm, to obtain a plurality of audio clips that are not mute

503

Recognizing the plurality of audio clips to obtain a plurality of audio clip texts included in the audio text

504

Determining, from the to-be-processed video, a plurality of video frame sequences corresponding one-to-one to the plurality of audio clips

505

Recognizing text information in each video frame in the plurality of video frame sequences to obtain a video frame text included in the video text For each video frame sequence in the plurality of video frame sequences, performing operations as follows:

5061

Splicing the text information included in each video frame in the video frame sequence, in units of one video frame text in at least one video frame text recognized from video frames in the video frame sequence, to obtain a plurality of video frame sequence texts corresponding to the video frame sequence

506

5062

Determining a target video frame sequence text, based on an editing distance between each video frame sequence text in the plurality of video frame sequence texts and a target audio clip text

507

Using each audio clip in the plurality of audio clips as the speech sample, and the target video frame sequence text corresponding to the audio clip as the label, to obtain the speech recognition training set

Fig. 5

METHOD AND DEVICE FOR GENERATING SPEECH RECOGNITION TRAINING SET

CROSS-REFERENCE TO RELATED APPLICATION

This application is a US National Stage of International Application No. PCT/CN2022/087029, filed on Apr. 15, 2022, which claims the benefit of and priority to Chinese Patent Application No. 202110514350.X, filed on May 8, 2021 and entitled "Method and Apparatus for Generating Speech Recognition Training Set," the entire disclosures of which are hereby incorporated by reference herein.

TECHNICAL FIELD

Embodiments of the present disclosure relate to the field of computer technology, in particular to a method and apparatus for generating a speech recognition training set.

BACKGROUND

In recent years, with the rapid development of deep learning technology, the use of deep neural network-based automatic speech recognition (ASR) models for speech recognition has become the current mainstream trend in the field of speech recognition technology. In order to improve the generalization performance of speech recognition models, it is necessary to collect speech data extensively and in large volume, and optimize the speech recognition models by manually labeling constructed training sets.

SUMMARY

Embodiments of the present disclosure propose a method and apparatus for generating a speech recognition training set.

In one or more embodiments, the present disclosure provides a method for generating a speech recognition training set, including: acquiring a to-be-processed audio and a to-be-processed video, where the to-be-processed video includes text information corresponding to the to-be-processed audio; recognizing the to-be-processed audio to obtain an audio text; recognizing text information in the to-be-processed video to obtain a video text; and using, based on consistency of the audio text with the video text, the to-be-processed audio as a speech sample and the video text as a label to obtain the speech recognition training set.

In one or more embodiments, the present disclosure provides an apparatus for generating a speech recognition training set, the apparatus including: an acquisition unit, configured to acquire a to-be-processed audio and a to-be-processed video, where the to-be-processed video includes text information corresponding to the to-be-processed audio; a first recognition unit, configured to recognize the to-be-processed audio to obtain an audio text; a second recognition unit, configured to recognize text information in the to-be-processed video to obtain a video text; and an obtaining unit, configured to use, based on consistency of the audio text with the video text, the to-be-processed audio as a speech sample and the video text as a label to obtain the speech recognition training set.

In one or more embodiments, the present disclosure provides a computer readable medium, storing a computer program thereon. The program, when executed by a processor, implements the method according to any foregoing embodiment.

In one or more embodiments, the present disclosure provides an electronic device, including: one or more processors; and a storage apparatus, storing one or more programs thereon. The one or more programs, when executed by the one or more processors, cause the one or more processors to implement the method according to any foregoing embodiment.

BRIEF DESCRIPTION OF THE DRAWINGS

Other features, objectives and advantages of the present disclosure will become more apparent, by reading detailed description of non-limiting embodiments with reference to the following accompanying drawings.

FIG. 2 is a flowchart of an embodiment of a method for generating a speech recognition training set according to the present disclosure;

FIG. 5 is a flowchart of another embodiment of the method for generating a speech recognition training set according to the present disclosure;

DETAILED DESCRIPTION OF EMBODIMENTS

The present disclosure is described in further detail below in connection with the accompanying drawings and embodiments. It may be understood that the specific embodiments described herein are only for the purpose of explaining the relevant disclosure, and are not a limitation of the disclosure. It should also be noted that, for ease of description, only parts related to the relevant disclosure are shown in the accompanying drawings.

It should be noted that the embodiments and features in the embodiments in the present disclosure may be combined with each other on a non-conflict basis. The present disclosure will be described in detail below with reference to the accompanying drawings and in connection with the embodiments.

Figure 1:
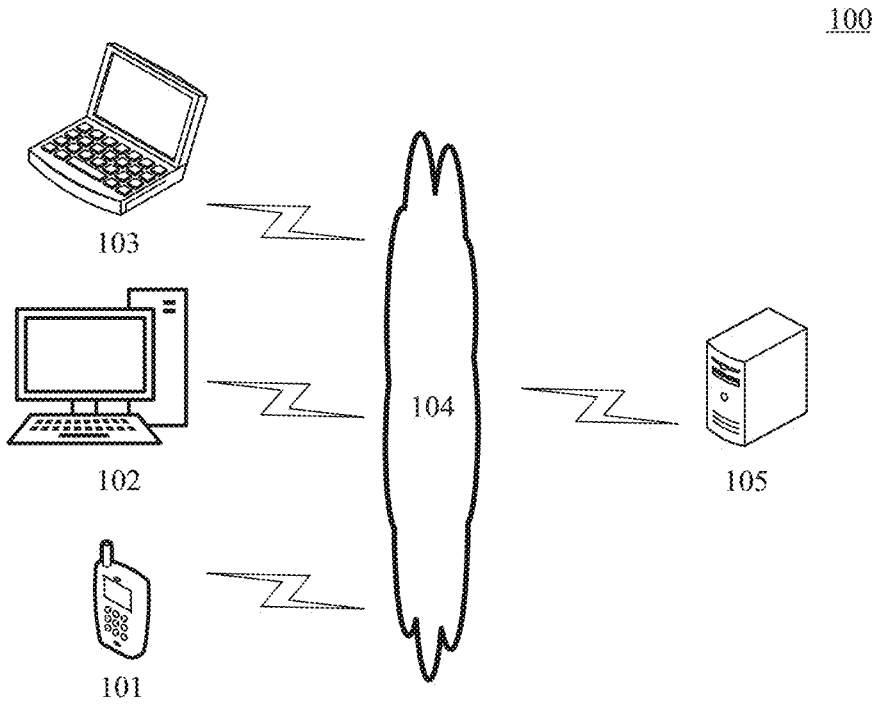
FIG. 1 is an exemplary system architecture diagram to which an embodiment of the present disclosure may be applied.

FIG. 1 illustrates an exemplary architecture 100 of a method and apparatus for generating a speech recognition training set to which the present disclosure may be applied.

As shown in FIG. 1, the system architecture 100 may include terminal devices 101, 102, and 103, a network 104, and a server 105. Communication connection between the terminal devices 101, 102, 103 form a topological network. The network 104 serves as a medium providing a communication link between the terminal devices 101, 102, 103, and the server 105. The network 104 may include various types of connections, such as wired, wireless communication links or optical fibers.

The terminal devices 101, 102, 103 may be hardware devices or software that support network connection and thus data interaction and data processing. When the terminal devices 101, 102, 103 are hardware, they may be various electronic devices that support network connection, information acquisition, interaction, display, processing, and other functions, including but not limited to smartphones, tablet computers, e-book readers, laptop computers and desktop computers, or the like. When the terminal devices 101, 102, 103 are software, they may be installed in the electronic devices listed above. The terminal devices may be implemented as, for example, a plurality pieces of software or a plurality of software modules used to provide distributed services, or as a single piece of software or a single software module, which is not limited herein.

The server 105 may be a server that provides various services, such as a backend processing server that acquires a corresponding to-be-processed video and a to-be-processed audio sent by a user through the terminal devices 101, 102, 103, then processes information, and automatically constructs a speech recognition training set. In addition, the server may also train an initial speech recognition model based on the speech recognition training set, or optimize a pre-trained speech recognition model. As an example, the server 105 may be a cloud server.

It should be noted that the server may be hardware or software. When the server is hardware, it may be implemented as a distributed server cluster consisting of multiple servers, or as a single server. When the server is software, it may be implemented as a plurality pieces of software or a plurality of software modules (e.g., software or software modules for providing distributed services), or as a single piece of software or a single software module, which is not limited herein.

It should also be noted that the method for generating a speech recognition training set provided in embodiments of the present disclosure may be performed by the server, may be performed by the terminal devices, or may be performed by the server and the terminal devices in cooperation with each other. Accordingly, various portions (e.g., various units) included in the apparatus for generating a speech recognition training set may all be provided in the server, may all be provided in the terminal devices, or may be separately provided in the server and the terminal devices.

It should be understood that the numbers of terminal devices, networks, and servers in FIG. 1 are only illustrative. Depending on implementation needs, there may be any number of terminal devices, networks, and servers. The system architecture may include only an electronic device (e.g., the server or the terminal devices) on which the method for generating a speech recognition training set runs, when the electronic device on which the method for generating a speech recognition training set runs does not require data transfer with other electronic devices. With further reference to FIG. 2, illustrating a flow 200 of an embodiment of a method for generating a speech recognition training set, including the following steps.

Step 201, acquiring a to-be-processed audio and a to-be-processed video.

In the present embodiment, an executing body (e.g., the server in FIG. 1) of the method for generating a speech recognition training set may acquire the to-be-processed audio and the to-be-processed video from a remote location or the local, by means of a wired network connection or a wireless network connection. Here, the to-be-processed video includes text information corresponding to the to-be-processed audio.

As an example, data including the corresponding to-be-processed audio and the to-be-processed video may be various audio and video data such as movies, television series, or short videos. The text information in the to-beprocessed video is subtitle information, and the to-be-processed audio is speech information corresponding to the subtitle information.

In the present embodiment, speech data represented by the to-be-processed audio may be various types of speech, including but not limited to foreign language audios, native language audios, and dialect audios. The to-be-processed audio and the to-be-processed video may be data of longer duration or data of shorter duration.

Step 202, recognizing the to-be-processed audio to obtain an audio text.

In the present embodiment, the executing body may recognize the to-be-processed audio to obtain the audio text.

As an example, the executing body may process the to-be-processed audio to obtain the audio text based on an automatic speech recognition model. The automatic speech recognition model is used to represent a corresponding relationship between the to-be-processed audio and the text.

In some alternative implementations of the present embodiment, the executing body may perform the above step 202 in the following method.

First, deleting a silent portion in the to-be-processed audio based on a mute detection algorithm, to obtain a plurality of audio clips that are not mute.

In this implementation, the executing body may use the silent portion in the to-be-processed audio as a segmentation point, and segment the to-be-processed audio after deleting the silent portion to obtain the plurality of audio clips.

For the case where the obtained audio clips are too long, the executing body may set a duration threshold, further cut audio clips whose duration is longer than the duration threshold in units of the duration represented by the duration threshold, and record start time and end time of each audio clip.

As an example, in order to prevent the mute detection algorithm from not being able to completely truncate the audio due to factors such as background music, which results in the obtained audio clips being too long, a duration threshold Tis set, and an audio clip whose duration is longer than the duration threshold T is forcibly cut into a plurality of clips of the duration T. The duration threshold may be set according to an actual situation, for example, T=10s.

Secondly, recognizing the plurality of audio clips to obtain a plurality of audio clip texts included in the audio text.

In this implementation, the executing body may input each audio clip of the plurality of audio clips into an automatic speech recognition model to obtain the plurality of audio clip texts. The plurality of audio clips correspond one-to-one to the plurality of audio clip texts, and the plurality of audio clip texts constitute the audio text.

Step 203, recognizing text information in the to-be-processed video to obtain a video text.

In the present embodiment, the executing body may recognize the text information in the to-be-processed video to obtain the video text.

As an example, for each video frame including the to-be-processed video, the executing body may use OCR (Optical Character Recognition) technology to recognize the text information included in the video frame, and splice the text information corresponding to each video frame in accordance with a playback order of the video frames in the to-be-processed video, to obtain the video text. OCR technology is currently a more mature technology, detailed description thereof will be omitted.

In some alternative implementations of the present embodiment, the executing body may perform the above step 203 in the following method.

First, determining, from the to-be-processed video, a plurality of video frame sequences corresponding one-to-one to the plurality of audio clips.

In this implementation, for each audio clip in the plurality of audio clips, the executing body may extract a plurality of video frames corresponding to the audio clip from the to-be-processed video, to obtain the video frame sequences.

As an example, the start time and end time of the audio clip are $t_{sk}$ and $t_{ek}$, respectively, and the executing body may determine start video frame and end video frame of the video frame sequence corresponding to the audio clip by means of $\lceil t_{sk}/f_p \rceil$ and $\lfloor t_{ek}/f_p \rfloor$, in sequence. Here, $\lceil \bullet \rceil$ and $\lfloor \bullet \rfloor$ represent upward rounding and downward rounding, respectively, and $f_p$ represents a frame rate of the to-be-processed video. The executing body may preset a sampling rate, and extract video frames from between the start frame $\lceil t_{sk}/f_p \rceil$ and the end frame $\lfloor t_{ek}/f_p \rfloor$ based on the sampling rate, to obtain the video frame sequence corresponding to the audio clip.

Secondly, recognizing text information in each video frame in the plurality of video frame sequences to obtain a video frame text included in the video text.

In this implementation, the executing body may use the OCR technology to recognize the text information in each video frame in the plurality of video frame sequences, to obtain the video frame text included in the video text.

It may be understood that for each video frame, the executing body may not have recognized the text information, i.e., the video frame does not include text information; or it may recognize multiple pieces of text information, and obtain a plurality of video frame texts. For example, the plurality of video frame texts include subtitle information in the video frame, and text information in a video frame picture (e.g., store name information in a store sign, road name information in a road sign, advertising slogan information, or the like).

In other cases, the same text information may be present in the text information included in adjacent frames. For example, subtitle information included in adjacent video frames are the same.

In the present embodiment, a preset identification may be added to the video frame to represent the situation in which the video frame does not include text information, or includes the same text information as an adjacent video frame. The preset identification may be any pre-set identification, such as "Blank".

Step 204, using, based on consistency of the audio text with the video text, the to-be-processed audio as a speech sample and the video text as a label to obtain the speech recognition training set.

In the present embodiment, the executing body may, based on the consistency of the audio text with the video text, use the to-be-processed audio as the speech sample and the video text as the label, to obtain the speech recognition training set.

As an example, when the audio text is consistent with the video text, the executing body may use the to-be-processed audio as the speech sample and the video text as the label, to obtain the speech recognition training set.

In some alternative implementations of the present embodiment, the executing body may perform the above step 204 in the following method.

First, for each video frame sequence in the plurality of video frame sequences, performing operations as follows.

First, splicing the text information included in each video frame in the video frame sequence, in units of one video frame text in at least one video frame text recognized from video frames in the video frame sequence, to obtain a plurality of video frame sequence texts corresponding to the video frame sequence.

As an example, the video frame sequence includes 3 video frames, and the number of video frame texts corresponding to the 3 video frames is 3, 4, and 3 in sequence, so that there are a total of 36 (3*4*3) plurality of video frame sequence texts corresponding to the video frame sequence.

In some alternative implementations, in a set of video frame texts corresponding to each video frame, in addition to the video frame texts recognized from the video frame, the preset identification representing that the video frame includes the same text information as an adjacent video frame may also included. The preset identification may also represent the situation in which the video frame does not include text information.

With further reference to the above example, after adding the preset identification to the combination of the video frame texts corresponding to each video frame, the number of video frame texts corresponding to the 3 video frames is 4, 5, and 4 in sequence, so that there are a total of 80 (4*5*4) plurality of video frame sequence texts corresponding to the video frame sequence.

Figure 3:
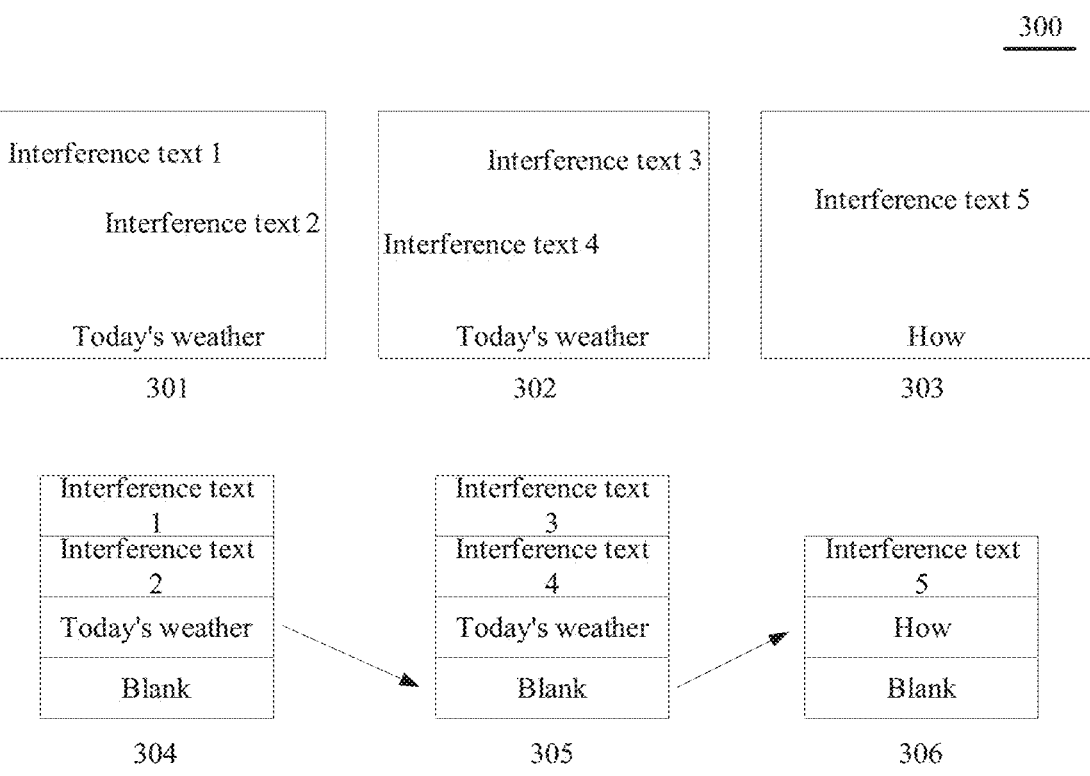
FIG. 3 is a schematic diagram of a text splicing process according to the present embodiment.

As shown in FIG. 3, the preset identification is "Blank", and recognition results corresponding to video frames 301, 302 and 303 are 304, 305 and 306 in sequence. For each video frame text in each video frame, it may be combined with the video frame texts in other video frames to obtain a plurality of video frame sequence texts. For example, the recognition results of the video frames 301, 302, and 303 may be combined as "what is the weather like today".

Secondly, determining a target video frame sequence text, based on an editing distance between each video frame sequence text in the plurality of video frame sequence texts and a target audio clip text.

Here, the target audio clip text is an audio clip text corresponding to an audio clip corresponding to the video frame sequence. The editing distance is the minimum number of edit operations required to convert from one string to the other between two strings.

As an example, the executing body may determine a video frame sequence text that has the minimum editing distance from the target audio clip text in the plurality of video frame sequence texts, as the target video frame sequence text.

Then, the executing body may use each of the plurality of audio clips as a speech sample, and use the target video frame sequence text corresponding to that audio clip as a label, to obtain the speech recognition training set.

In some alternative implementations of the present embodiment, the executing body may perform the above first step in the following method.

For each video frame in the video frame sequence that includes text information, performing operations as follows:

First, determining a plurality of to-be-spliced texts corresponding to the video frame, and splicing the plurality of to-be-spliced texts with at least one video frame text in the video frame to obtain a plurality of spliced texts.

Then, selecting a preset number of spliced texts from the plurality of spliced texts, based on an editing distance between the plurality of spliced texts and the target audio clip text, as the plurality of to-be-spliced texts corresponding to a next video frame of the video frame.

As an example, the executing body may sort the editing distances in ascending order, and select a first preset number of spliced texts as the plurality of to-be-spliced texts corresponding to the next video frame of the video frame. The preset number may be set according to the actual situation, for example, it may be 10.

In the case where the number of the obtained spliced texts is small (e.g., the number of the spliced texts is less than a preset number), the executing body may set a preset distance threshold to delete spliced texts having an editing distance that is less than the preset distance threshold.

It may be understood that the executing body, in response to a situation in which the number of spliced texts is large, may also determine the plurality of to-be-spliced texts corresponding to the next video frame of the video frame in combination with selecting the preset number of texts, and deleting texts having an editing distance that is less than the preset distance threshold.

As another example, the executing body may determine a matching degree between the retained plurality of spliced text and the audio text by using the following formula:

$$Q_i = -|d(P_{ki}, S_k) - |\|S_k\| - \|p_{ki}\|\||$$

Where, $d(\bullet, \bullet)$ represents an editing distance calculation function of two texts, $\|\bullet\|$ represents a length of the text, $p_{ki}$ represents the spliced text, $S_k$ represents the audio text, and $Q_i$ represents the matching degree between the two texts. In order to further reduce the number of spliced texts obtained after each splicing, a matching degree threshold $T_h$ is designed, and the spliced text is deleted when $Q_i < T_h$. For example, $T_h = -3$.

In some alternative implementations of the present embodiment, the executing body may also, for each video frame sequence in the plurality of video frame sequences, in response to determining that the editing distance between the target video frame sequence text corresponding to the video frame sequence and the target audio clip text is greater than a preset distance threshold, delete training samples corresponding to the video frame sequence in the speech recognition training set, thereby filtering low-quality training samples.

Figure 4:
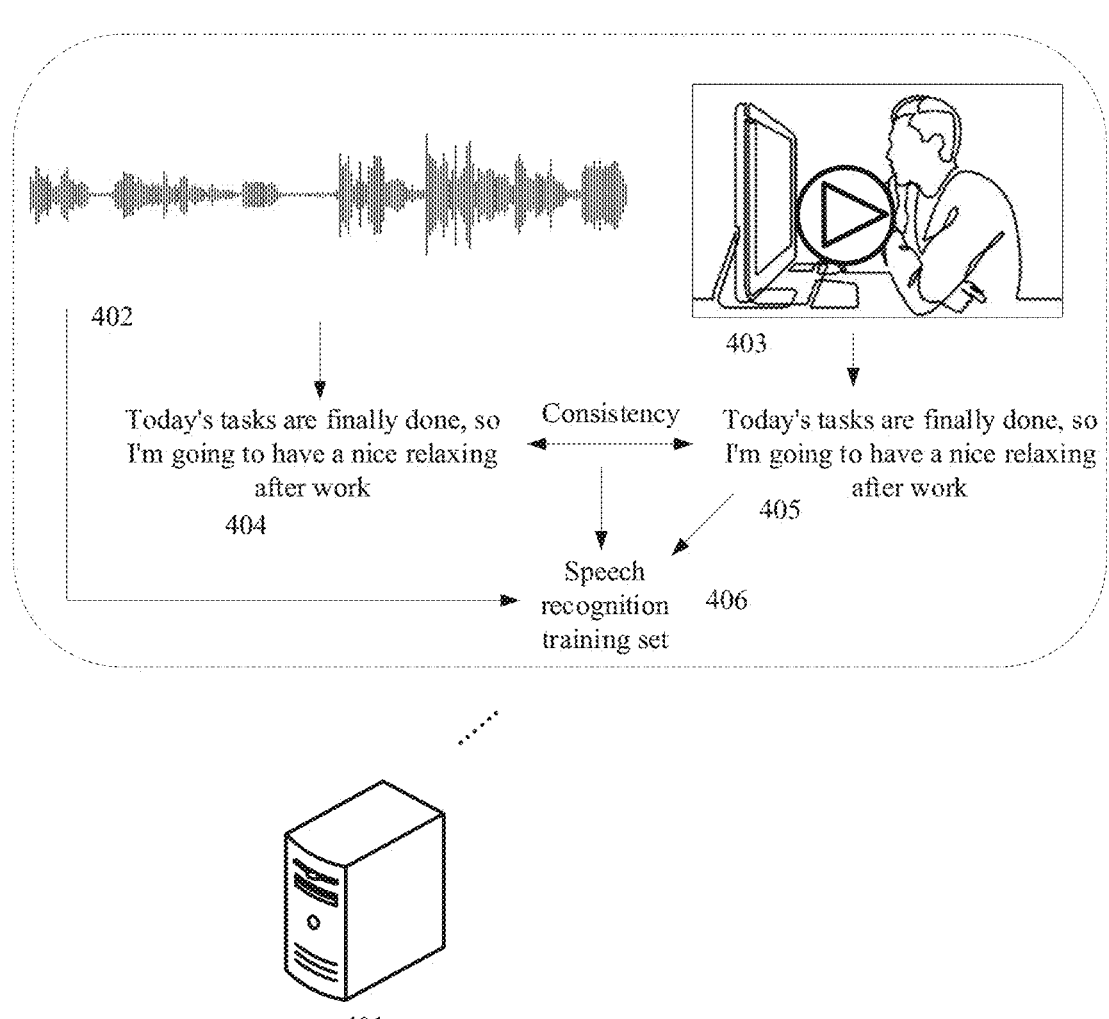
FIG. 4 is a schematic diagram of an application scenario of the method for generating a speech recognition training set according to the present embodiment.

With further reference to FIG. 4, FIG. 4 is a schematic diagram 400 of an application scenario of the method for generating a speech recognition training set according to the present embodiment. In the application scenario of FIG. 4, first, a server 401 acquires a to-be-processed audio 402 and a to-be-processed video 403. The to-be-processed video 403 includes text information corresponding to the to-be-processed audio 402. Then, the server 401 recognizes the to-be-processed audio 402 to obtain an audio text 404; and recognizes text information in the to-be-processed video 403 to obtain a video text 405. Finally, the server 401 uses, based on consistency of the audio text 404 with the video text 405, the to-be-processed audio 402 as a speech sample and the video text 405 as a label to obtain a speech recognition training set 406.

The method provided by the above embodiment of the present disclosure, by acquiring a to-be-processed audio and a to-be-processed video, where the to-be-processed video includes text information corresponding to the to-be-processed audio; recognizing the to-be-processed audio to obtain an audio text; recognizing text information in the to-be-processed video to obtain a video text; and based on consistency of the audio text with the video text, using the to-be-processed audio as a speech sample and the video text as a label to obtain the speech recognition training set, thereby providing a method for automatically acquiring a speech recognition training set, which improves the flexibility and efficiency of constructing a speech recognition training set.

In some alternative implementations of the present embodiment, the executing body may train an untrained initial speech recognition model, or optimize a pre-trained speech recognition model, based on the speech recognition training set.

Specifically, the executing body adopts a machine learning algorithm to train the untrained initial speech recognition model, or optimize the pre-trained speech recognition model to obtain a final speech recognition model, using the to-be-processed audio in training samples as an input and the inputted to-be-processed audio as a desired output.

With further reference to FIG. 5, illustrating a schematic flow 500 of an embodiment of the method for generating a speech recognition training set according to the present disclosure, including the following steps.

Step 501, acquiring a to-be-processed audio and a to-be-processed video.

The to-be-processed video includes text information corresponding to the to-be-processed audio.

Step 502, deleting a silent portion in the to-be-processed audio based on a mute detection algorithm, to obtain a plurality of audio clips that are not mute.

Step 503, recognizing the plurality of audio clips to obtain a plurality of audio clip texts included in the audio text.

Step 504, determining, from the to-be-processed video, a plurality of video frame sequences corresponding one-to-one to the plurality of audio clips.

Step 505, recognizing text information in each video frame in the plurality of video frame sequences to obtain a video frame text included in the video text.

Step 506, for each video frame sequence in the plurality of video frame sequences, performing operations as follows:

Step 5061, splicing the text information included in each video frame in the video frame sequence, in units of one video frame text in at least one video frame text recognized from video frames in the video frame sequence, to obtain a plurality of video frame sequence texts corresponding to the video frame sequence.

Step 5062, determining a target video frame sequence text, based on an editing distance between each video frame sequence text in the plurality of video frame sequence texts and a target audio clip text, where the target audio clip text is an audio clip text corresponding to an audio clip corresponding to the video frame sequence.

Step 507, using each audio clip in the plurality of audio clips as the speech sample, and the target video frame sequence text corresponding to the audio clip as the label, to obtain the speech recognition training set.

As can be seen from the present embodiment, compared to the corresponding embodiment of FIG. 2, the flow 400 of the method for generating a speech recognition training set in the present embodiment specifies the process of segmenting the to-be-processed audio and the to-be-processed video, as well as the process of splicing the video frame text, which improves an accuracy of the training samples in the speech recognition training set.

Figure 6:
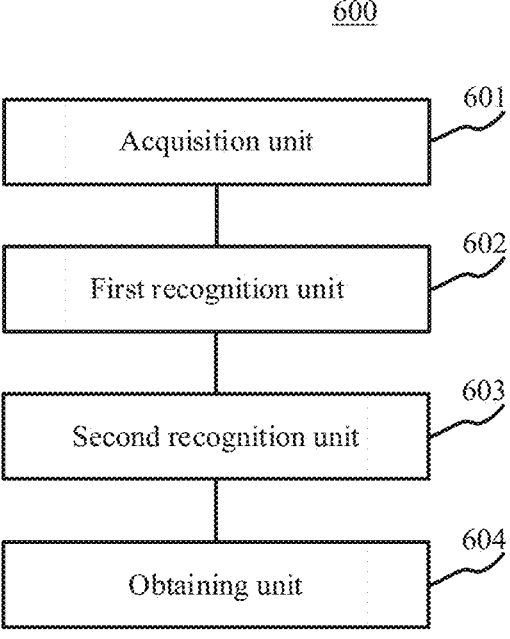
FIG. 6 is a structural diagram of an embodiment of an apparatus for generating a speech recognition training set according to the present disclosure.

With further reference to FIG. 6, as an implementation of the method shown in the above figures, the present disclosure provides an embodiment of an apparatus for generating a speech recognition training set, the embodiment of the apparatus corresponds to the embodiment of the method shown in FIG. 2, and the apparatus may be applied in various electronic devices.

As shown in FIG. 6, the apparatus for generating a speech recognition training set includes: an acquisition unit 601, configured to acquire a to-be-processed audio and a to-be-processed video, where the to-be-processed video includes text information corresponding to the to-be-processed audio; a first recognition unit 602, configured to recognize the to-be-processed audio to obtain an audio text; a second recognition unit 603, configured to recognize text information in the to-be-processed video to obtain a video text; and an obtaining unit 604, configured to use, based on consistency of the audio text with the video text, the to-be-processed audio as a speech sample and the video text as a label to obtain the speech recognition training set.

In some alternative implementations of the present embodiment, the first recognition unit 602 is further configured to: delete a silent portion in the to-be-processed audio based on a mute detection algorithm, to obtain a plurality of audio clips that are not mute; and recognize the plurality of audio clips to obtain a plurality of audio clip texts included in the audio text.

In some alternative implementations of the present embodiment, the second recognition unit 603 is further configured to: determine, from the to-be-processed video, a plurality of video frame sequences corresponding one-to-one to the plurality of audio clips; and recognize text information in each video frame in the plurality of video frame sequences to obtain a video frame text included in the video text.

In some alternative implementations of the present embodiment, the obtaining unit 604 is further configured to: for each video frame sequence in the plurality of video frame sequences, perform operations as follows: splicing the text information included in each video frame in the video frame sequence, in units of one video frame text in at least one video frame text recognized from video frames in the video frame sequence, to obtain a plurality of video frame sequence texts corresponding to the video frame sequence; determining a target video frame sequence text, based on an editing distance between each video frame sequence text in the plurality of video frame sequence texts and a target audio clip text, where the target audio clip text is an audio clip text corresponding to an audio clip corresponding to the video frame sequence; and use each audio clip in the plurality of audio clips as the speech sample, and the target video frame sequence text corresponding to the audio clip as the label, to obtain the speech recognition training set.

In some alternative implementations of the present embodiment, the obtaining unit 604 is further configured to: for each video frame in the video frame sequence that includes text information, perform operations as follows: determining a plurality of to-be-spliced texts corresponding to the video frame, and splicing the plurality of to-be-spliced texts with at least one video frame text in the video frame to obtain a plurality of spliced texts; and selecting a preset number of spliced texts from the plurality of spliced texts, based on an editing distance between the plurality of spliced texts and the target audio clip text, as the plurality of to-be-spliced texts corresponding to a next video frame of the video frame.

In some alternative implementations of the present embodiment, the apparatus further includes: a deletion unit (not shown in the figure), configured to, for each video frame sequence in the plurality of video frame sequences, in response to determining that the editing distance between the target video frame sequence text corresponding to the video frame sequence and the target audio clip text is greater than a preset distance threshold, delete training samples corresponding to the video frame sequence in the speech recognition training set.

In the present embodiment, the acquisition unit in the apparatus for generating a speech recognition training set acquires a to-be-processed audio and a to-be-processed video, where the to-be-processed video includes text information corresponding to the to-be-processed audio; the first recognition unit recognizes the to-be-processed audio to obtain an audio text; the second recognition unit recognizes text information in the to-be-processed video to obtain a video text; and the obtaining unit, based on consistency of the audio text with the video text, uses the to-be-processed audio as a speech sample and the video text as a label to obtain the speech recognition training set, thereby providing an apparatus for automatically acquiring a speech recognition training set, which improves the flexibility and efficiency of constructing a speech recognition training set.

Figure 7:
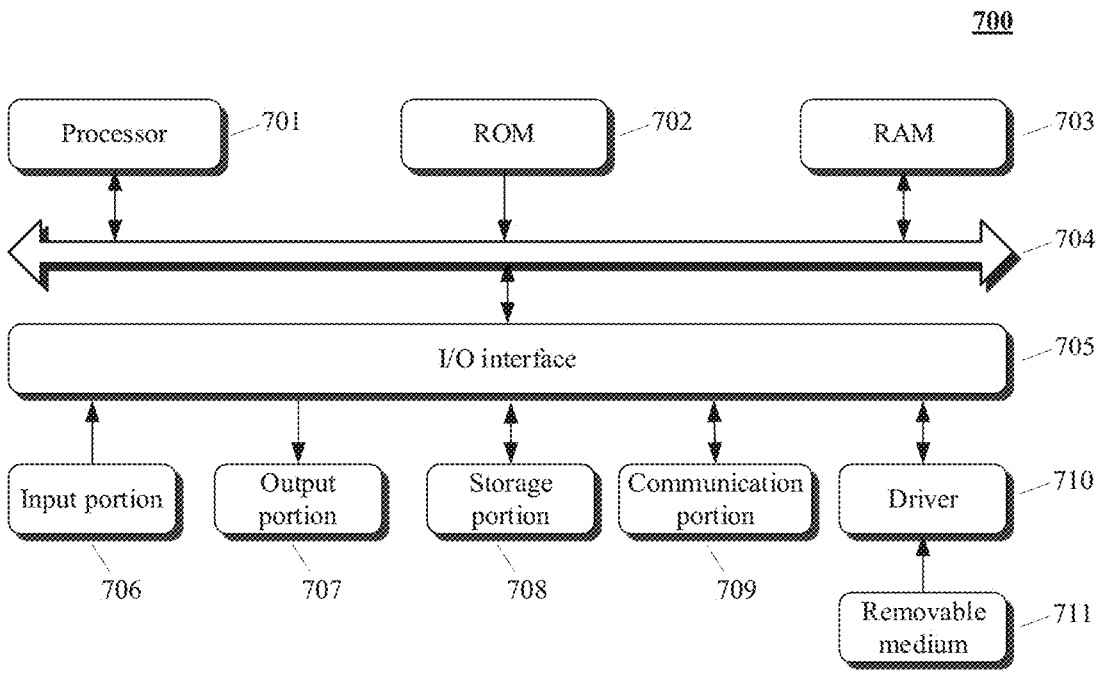
FIG. 7 is a schematic structural diagram of a computer system suitable for implementing embodiments of the present disclosure.

Reference is made below to FIG. 7, which illustrates a schematic structural diagram of a computer system 700 suitable for implementing devices of embodiments of the present disclosure (e.g., the devices 101, 102, 103, 105 shown in FIG. 1). The devices shown in FIG. 7 are merely examples and should not impose any limitations on the functionality and scope of use of the embodiments of the present disclosure.

As shown in FIG. 7, the computer system 700 includes a processor (e.g., CPU, central processing unit) 701 that can perform a variety of appropriate actions and processes based on a program stored in a read only memory (ROM) 702 or loaded from a storage portion 708 into a random access memory (RAM) 703. In the RAM 703, various programs and data required for the operation of the system 700 may also be stored. The processor 701, the ROM 702, and the RAM 703 are connected to each other through a bus 704. An input/output (I/O) interface 705 is also connected to the bus 704.

The following components are connected to the I/O interface 705: an input portion 706 including a keyboard, a mouse, etc.; an output portion 707 including a cathode ray tube (CRT), a liquid crystal display (LCD), and a speaker, etc.; a storage portion 708 including a hard disk, etc.; and a communication portion 709 including a network interface card, such as a LAN card, or a modem. The communication portion 709 performs communication processing via a network such as the Internet. A drive 710 is also connected to the I/O interface 705 as needed. A removable medium 711, such as a disk, a CD-ROM, a magnetic disk, or a semiconductor memory, may be mounted to the drive 710 as needed, so that computer programs read therefrom may be mounted to the storage portion 708 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 709, and/or be installed from the removable medium 711. The computer program, when executed by the processor 701, implements the above-mentioned functionalities as defined by the method of the present disclosure.

It should be noted that the computer readable medium in the present disclosure may be computer readable signal medium or computer readable storage medium or any combination of the above two. The computer readable storage medium of an embodiment of the present disclosure may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including an acquisition unit, a first recognition unit, a second recognition unit, and an obtaining unit. Here, the names of these units do not in some cases constitute limitations to such units themselves. For example, the obtaining unit may also be described as "a unit configured to use, based on consistency of the audio text with the video text, the to-be-processed audio as a speech sample and the video text as a label to obtain the speech recognition training set".

As another aspect, the present disclosure also provides a computer readable medium, the computer readable medium may be included in the device described in the above embodiment, or a stand-alone computer readable medium not assembled into the device. The computer readable medium carries one or more programs. The one or more programs, when executed by the apparatus, cause the computer device to: acquire a to-be-processed audio and a to-be-processed video, where the to-be-processed video includes text information corresponding to the to-be-processed audio; recognize the to-be-processed audio to obtain an audio text; recognize text information in the to-be-processed video to obtain a video text; and based on consistency of the audio text with the video text, use the to-be-processed audio as a speech sample and the video text as a label to obtain the speech recognition training set.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for generating a speech recognition training set, the method comprising:

acquiring a to-be-processed audio and a to-be-processed video, wherein the to-be-processed video comprises text information corresponding to the to-be-processed audio;

recognizing the to-be-processed audio to obtain an audio text;

recognizing text information in the to-be-processed video to obtain a video text; and using, based on consistency of the audio text with the video text, the to-be-processed audio as a speech sample and the video text as a label to obtain the speech recognition training set, comprising:

for each video frame sequence of a plurality of video frame sequences, in the to-be-processed video, performing operations as follows: splicing the text information included in each video frame in the video frame sequence, in units of one video frame text in at least one video frame text recognized from video frames in the video frame sequence, to obtain a plurality of video frame sequence texts corresponding to the video frame sequence;

determining a target video frame sequence text, based on an editing distance between each video frame sequence text in the plurality of video frame sequence texts and a target audio clip text, wherein the target audio clip text is an audio clip text corresponding to an audio clip corresponding to the video frame sequence; and using each audio clip of a plurality of audio clips in the to-be-processed audio as the speech sample, and the target video frame sequence text corresponding to the audio clip as the label, to obtain the speech recognition training set.

2. The method according to claim 1, wherein recognizing the to-be-processed audio to obtain the audio text, comprises:

deleting a silent portion in the to-be-processed audio based on a mute detection algorithm, to obtain the plurality of audio clips that are not mute; and recognizing the plurality of audio clips to obtain a plurality of audio clip texts included in the audio text.

3. The method according to claim 2, wherein recognizing text information in the to-be-processed video to obtain the video text, comprises:

determining, from the to-be-processed video, the plurality of video frame sequences, each of the plurality of video frame sequences corresponding one-to-one to the plurality of audio clips; and recognizing text information in each video frame in the plurality of video frame sequences to obtain the video frame text included in the video text.

4. The method according to claim 1, wherein splicing the text information included in each video frame in the video frame sequence, in units of one video frame text in at least one video frame text recognized from video frames in the video frame sequence, to obtain the plurality of video frame sequence texts corresponding to the video frame sequence, comprises:

for each video frame in the video frame sequence that comprises text information, performing operations as follows:

determining a plurality of to-be-spliced texts corresponding to the video frame, and splicing the plurality of to-be-spliced texts with at least one video frame text in the video frame to obtain a plurality of spliced texts; and selecting a preset number of spliced texts from the plurality of spliced texts, based on an editing distance between the plurality of spliced texts and the target audio clip text, as the plurality of to-be-spliced texts corresponding to a next video frame of the video frame.

5. The method according to claim 1, wherein the method further comprises:

for each video frame sequence in the plurality of video frame sequences, in response to determining that the editing distance between the target video frame sequence text corresponding to the video frame sequence and the target audio clip text is greater than a preset distance threshold, deleting training samples corresponding to the video frame sequence in the speech recognition training set.

6. An apparatus for generating a speech recognition training set, the apparatus comprising:

one or more processors; and a memory, storing one or more programs thereon, wherein the one or more programs, when executed by the one or more processors, cause the one or more processors to perform operations, the operations comprising:

acquiring a to-be-processed audio and a to-be-processed video, wherein the to-be-processed video comprises text information corresponding to the to-be-processed audio;

recognizing the to-be-processed audio to obtain an audio text;

recognizing text information in the to-be-processed video to obtain a video text; and using, based on consistency of the audio text with the video text, the to-be-processed audio as a speech sample and the video text as a label to obtain the speech recognition training set, comprising:

for each video frame sequence of a plurality of video frame sequences in the to-be-processed video, performing operations as follows: splicing the text information included in each video frame in the video frame sequence, in units of one video frame text in at least one video frame text recognized from video frames in the video frame sequence, to obtain a plurality of video frame sequence texts corresponding to the video frame sequence; determining a target video frame sequence text, based on an editing distance between each video frame sequence text in the plurality of video frame sequence texts and a target audio clip text, wherein the target audio clip text is an audio clip text corresponding to an audio clip corresponding to the video frame sequence; and using each audio clip of a plurality of audio clips as the speech sample in the to-be-processed audio, and the target video frame sequence text corresponding to the audio clip as the label, to obtain the speech recognition training set.

7. The apparatus according to claim 6, wherein recognizing the to-be-processed audio to obtain the audio text, comprises:

deleting a silent portion in the to-be-processed audio based on a mute detection algorithm, to obtain the plurality of audio clips that are not mute; and recognizing the plurality of audio clips to obtain a plurality of audio clip texts included in the audio text.

8. The apparatus according to claim 7, wherein recognizing text information in the to-be-processed video to obtain the video text, comprises:

determining, from the to-be-processed video, the plurality of video frame sequences, each of the plurality of video frame sequences corresponding one-to-one to the plurality of audio clips; and recognizing text information in each video frame in the plurality of video frame sequences to obtain the video frame text included in the video text.

9. The apparatus according to claim 6, wherein splicing the text information included in each video frame in the video frame sequence, in units of one video frame text in at least one video frame text recognized from video frames in the video frame sequence, to obtain the plurality of video frame sequence texts corresponding to the video frame sequence, comprises:

for each video frame in the video frame sequence that comprises text information, performing operations as follows: determining a plurality of to-be-spliced texts corresponding to the video frame, and splicing the plurality of to-be-spliced texts with at least one video frame text in the video frame to obtain a plurality of spliced texts; and selecting a preset number of spliced texts from the plurality of spliced texts, based on an editing distance between the plurality of spliced texts and the target audio clip text, as the plurality of to-be-spliced texts corresponding to a next video frame of the video frame.

10. The apparatus according to claim 6, wherein the operations further comprise:

for each video frame sequence in the plurality of video frame sequences, in response to determining that the editing distance between the target video frame sequence text corresponding to the video frame sequence and the target audio clip text is greater than a preset distance threshold, deleting training samples corresponding to the video frame sequence in the speech recognition training set.

11. A non-transitory computer readable medium, storing a computer program thereon, wherein, the program, when executed by a processor, causes the processor to perform operations, the operations comprising:

acquiring a to-be-processed audio and a to-be-processed video, wherein the to-be-processed video comprises text information corresponding to the to-be-processed audio;

recognizing the to-be-processed audio to obtain an audio text;

recognizing text information in the to-be-processed video to obtain a video text; and using, based on consistency of the audio text with the video text, the to-be-processed audio as a speech sample and the video text as a label to obtain a speech recognition training set, comprising:

for each video frame sequence of a plurality of video frame sequences in the to-be-processed video, performing operations as follows: splicing the text information included in each video frame in the video frame sequence, in units of one video frame text in at least one video frame text recognized from video frames in the video frame sequence, to obtain a plurality of video frame sequence texts corresponding to the video frame sequence; determining a target video frame sequence text, based on an editing distance between each video frame sequence text in the plurality of video frame sequence texts and a target audio clip text, wherein the target audio clip text is an audio clip text corresponding to an audio clip corresponding to the video frame sequence; and using each audio clip of a plurality of audio clips as the speech sample in the to-be-processed audio, and the target video frame sequence text corresponding to the audio clip as the label, to obtain the speech recognition training set.

12. The non-transitory computer readable medium according to claim 11, wherein recognizing the to-be-processed audio to obtain the audio text, comprises:

deleting a silent portion in the to-be-processed audio based on a mute detection algorithm, to obtain the plurality of audio clips that are not mute; and recognizing the plurality of audio clips to obtain a plurality of audio clip texts included in the audio text.

13. The non-transitory computer readable medium according to claim 12, wherein recognizing text information in the to-be-processed video to obtain the video text, comprises:

determining, from the to-be-processed video, the plurality of video frame sequences, each of the plurality of video frame sequences corresponding one-to-one to the plurality of audio clips; and recognizing text information in each video frame in the plurality of video frame sequences to obtain the video frame text included in the video text.

14. The non-transitory computer readable medium according to claim 11, wherein splicing the text information included in each video frame in the video frame sequence, in units of one video frame text in at least one video frame text recognized from video frames in the video frame sequence, to obtain the plurality of video frame sequence texts corresponding to the video frame sequence, comprises:

for each video frame in the video frame sequence that comprises text information, performing operations as follows:

determining a plurality of to-be-spliced texts corresponding to the video frame, and splicing the plurality of to-be-spliced texts with at least one video frame text in the video frame to obtain a plurality of spliced texts; and selecting a preset number of spliced texts from the plurality of spliced texts, based on an editing distance between the plurality of spliced texts and the target audio clip text, as the plurality of to-be-spliced texts corresponding to a next video frame of the video frame.

15. The non-transitory computer readable medium according to claim 11, wherein the operations further comprise:

for each video frame sequence in the plurality of video frame sequences, in response to determining that the editing distance between the target video frame sequence text corresponding to the video frame sequence and the target audio clip text is greater than a preset distance threshold, deleting training samples corresponding to the video frame sequence in the speech recognition training set.

\* \* \* \* \*